United States Patent [19]
Lathrop et al.

[11] Patent Number: 5,918,922
[45] Date of Patent: Jul. 6, 1999

[54] SCOOP

[75] Inventors: Gregory Alan Lathrop, Manchester; Edward John Giblin, Finksburg, both of Md.

[73] Assignee: Lever Brothers Company, New York, N.Y.

[21] Appl. No.: 08/999,358

[22] Filed: Dec. 29, 1997

[51] Int. Cl.⁶ .................................................. A47J 43/00
[52] U.S. Cl. ............................ 294/55; D7/691; D10/46.2
[58] Field of Search ...................... 294/55, 49; D7/691; D10/46.2; 30/324, 327, 328; 73/426–429

[56] References Cited

U.S. PATENT DOCUMENTS

| D. 321,305 | 11/1991 | Underwood et al. | |
| D. 330,997 | 11/1992 | Spahni, Jr. et al. | D7/691 |
| D. 338,599 | 8/1993 | Zogg et al. | D10/46.2 |
| D. 352,869 | 11/1994 | Lathrop | D7/691 |
| 3,013,436 | 12/1961 | Dailey | D10/46.2 |
| 5,137,316 | 8/1992 | Foos | 294/55 |
| 5,347,865 | 9/1994 | Mulry et al. | 294/55 |

OTHER PUBLICATIONS

"Thermoforming", The Wiley Encyclopedia of Packaging Technology, 2$^{nd}$ Ed., pp. 914–921 (1997).

*Primary Examiner*—Dean Kramer
*Attorney, Agent, or Firm*—Gerard J. McGowan, Jr.

[57] ABSTRACT

A scoop having good structural strength, particularly for use in powdered laundry detergents and other powdered household products. A plurality of ribs projects outwardly or inwardly from the rear sidewall and preferably extends at least 60% of the height of the sidewall. In addition, the ribs are tapered from side to side and top to bottom.

16 Claims, 3 Drawing Sheets

SCOOP

FIELD OF THE INVENTION

Various forms of scoops have been produced to assist the consumer in dispensing powdered laundry detergents. Typically such scoops include a bucket portion for containing the powdered product and an integral handle portion for grasping the scoop. It is of course important that the handle be strong enough to enable the consumer readily to lift and pour product from the scoop when the scoop is full of product, particularly concentrated powder.

While it is important that the scoop be strong, it is also important to minimize the amount of material from which it is made. Typically scoops are made of a polymeric substance, and minimizing the amount of polymer used helps conserve precious resource. Likewise, it is important to decrease the amount of material used in fabricating the scoop in order to reduce the amount of waste material when the scoop is no longer needed and to minimize the cost of the implement.

It is known to provide scoops with ribs extending along the underside of the handle and continuing down the outside of the rear wall of the bucket. For example, the Lever Brothers Company has sold such a scoop having three ribs extending along the underside of the handle and almost halfway down the rear wall of the bucket. The ribs protrude outwardly from the bottom of the handle and outwardly from the outer surface of the rear wall of the bucket.

The Procter and Gamble Company has sold a scoop with three ribs, the middle rib protruding downwardly from the underside of the handle and outwardly from the outer surface or the rear wall of the bucket, whereas the two outer ribs protrude upwardly from the upper surface of the handle and inwardly from the inner surface of the rear wall of the bucket. The P&G ribs extend most of the length of the handle and most of the height of the rear wall of the bucket.

Arm & Hammer has sold with its Ultra Fresh product a scoop having a rib protruding outwardly along most of the length of the underside of the handle and down most of the height of the outer surface of the rear wall of the bucket. In addition, two enlarged supports on either side of the rib and a third enlarged support underlying the rib are present on the outer surface of the Arm & Hammer rear bucket wall.

Despite the various scoops presently available, there is still a need for a scoop which can be a very light weight yet which is strong enough for dispensing of concentrated detergent powders.

SUMMARY OF THE INVENTION

The present invention is directed to a scoop having improved structural strength, which permits use of less resource in its manufacture. In a first embodiment, the scoop comprises a basket, an integrally formed handle, and a plurality of ribs extending from said handle down an inner or outer face of said sidewall, at least 60% of the length of the sidewall. In a preferred embodiment, at least three ribs project outwardly from the underside of the handle and the outer face of the first sidewall. Still more preferably, scoops according to the invention may have a thickness which on average is no greater than 0.0312 inches thick. The scoop is preferably molded from a polymeric material.

In accordance with another preferred embodiment, the scoop comprises ribs which have on one or both sides rectilinear portions which taper. A taper of at least 1° is preferred. In a still further preferred embodiment, the rib is also tapered such that the distance between its maximum distance from the sidewall decreases as the rib extends toward the bottom of the sidewall.

For a more complete understanding of the above and other features and advantages of the invention, reference should be made to the following detailed description of preferred embodiments and to the accompanying drawings.

DETAILED DESCRIPTION OF THE INVENTION

Scoop 10 comprises a basket portion 12 for containing product and a handle portion 14. Scoop 10 is preferably made of a polymeric material such as recycled polyethylene terephthalate and is preferably formed by molding. The scoop may be thermoformed from a sheet of polymeric material. Other polymers which may be used to fabricate the scoop include polyethylene, polypropylene, polystyrene, as well as multilayer structures including those with a foamed core.

Figure 5:
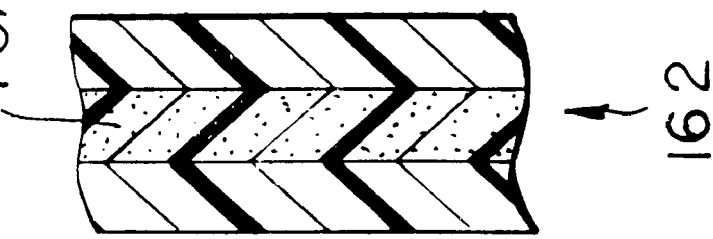
FIG. 5 is a section of an alternative material from which the scoop of the invention may be made.
Figure 4:
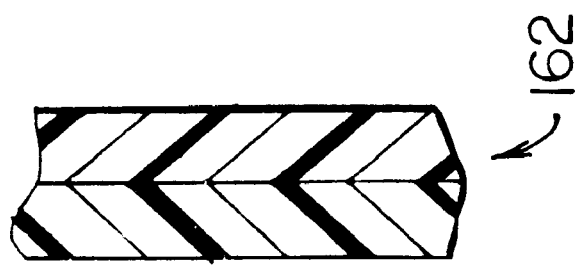
FIG. 4 is a section of a material from which the scoop of the invention may be made.

FIG. 4 illustrates a multilayer material 160 from which the scoop may be made whereas FIG. 5 illustrates a multilayer material 162 having a foamed core from which the scoop may be made.

Basket portion 12 includes four sidewalls 16, 18, 20 and 22 and bottom wall 24. Sidewall 16 is at the rear of the basket and extends between bottom wall 24 and handle 14.

Figure 2:
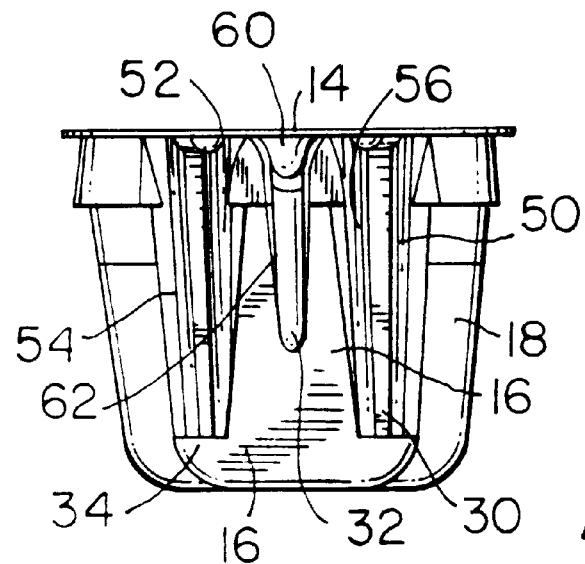
FIG. 2 is a rear elevational view of the scoop of FIG. 1.
Figure 3:
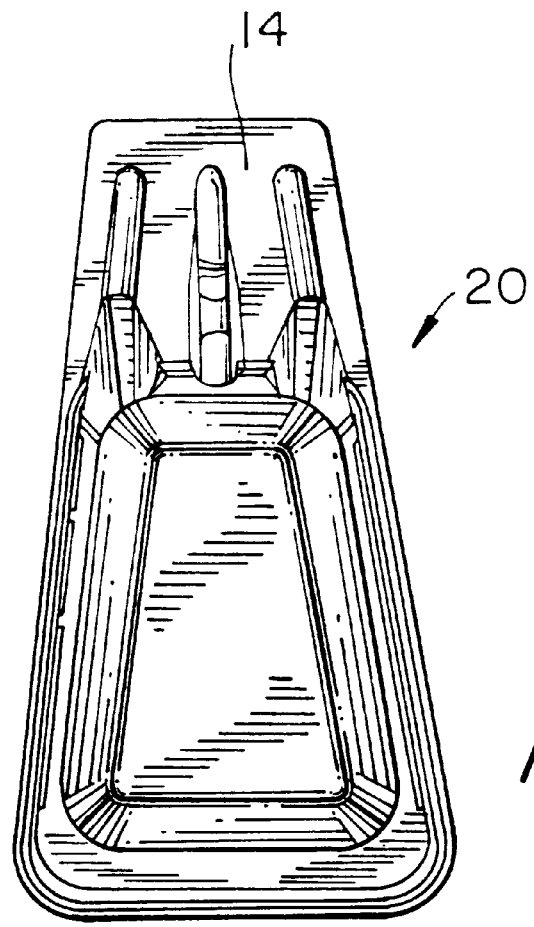
FIG. 3 is a top plan view of the scoop of FIG. 1.

Projecting outwardly from the outer surface of rear sidewall 16 are ribs 30, 32 and 34. At the top of rear wall 16, at the intersection with handle 14, ribs 30, 32 and 34 continue along the handle, projecting outwardly from the underside thereof. As will be apparent from FIG. 2, ribs 30 and 34 extend a very substantial distance along the height of wall 16. It is preferred that at least two of the ribs project out of the same face of the rear sidewall (either the inner force, which faces the basket, or the outer face, which faces the handle) and extend from the handle down the sidewall at least 60% of the length of the sidewall. Preferably, a plurality of ribs extends down at least one of the faces of the rear sidewall to the extent of at least 75% of the length of the sidewall.

Figure 1:
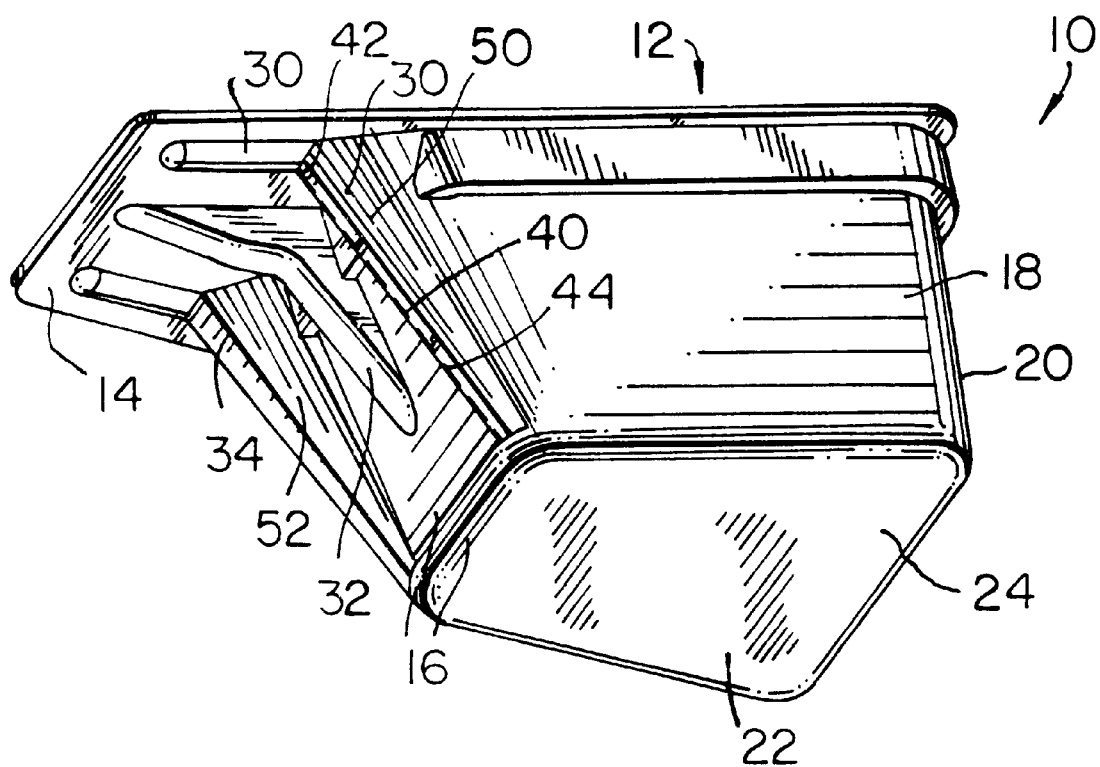
FIG. 1 is a perspective view of a scoop according to the invention.

As best seen in FIG. 1, the ribs taper longitudinally as they extend down the height of the rear sidewall 16. In particular, a line drawn along the maximum point of the rib from the top to the bottom of the rear sidewall 16 (hereinafter line of maximum projection) tapers as the rib extends downwardly from handle 14. For instance, it can be seen that along imaginary line of projection 40 for rib 30 the distance from point 42 to the plane of rear wall 16 would be much greater than the distance at point 44. This reflects the fact that the rib is tapering inwardly as it extends longitudinally down rear sidewall 16. The angle of taper of the line of maximum projection with respect to the plane of the rear sidewall 16, preferably varies from 10° to 20°.

Another preferred aspect of the ribs of the invention is a sideways taper. It is preferred that at least two of the ribs include a rectilinear portion extending at least part way between the line of maximum projection and the plane of the rear sidewall 16 of the scoop. Moreover, it is preferred that this rectilinear section be disposed at an angle to a plane extending through the line of maximum projection from the rear to the front of the scoop (eg. along a longitudinal axis of the scoop seen in FIG. 1). This defines a side to side taper of the rib.

Preferably the side to side taper is at least 1° on at least one of the sides of each of the plurality of ribs projecting from the rear sidewall. Especially preferred is a taper of at least 2° with respect to the plane running through the maximum line of projection. In FIG. 1 for instance, rectilinear sections 50 and 52 can be seen on the right sides of ribs 30 and 34, respectively. Although not seen in FIG. 1, rectilinear tapered sections 54 and 56 are disposed on ribs 34 and 30. Typically the rectilinear tapered sidewalls of rib 32 will be smaller than the corresponding rib sidewalls of ribs 30 and 34. These can be seen as rib sidewalls 60 and 62 in FIG. 2.

The scoop of the invention enjoys good structural strength and may be made using reduced amount of resource. Preferably for a 0.4 cup size scoop the thickness of the PET or other sheets used can be reduced from 0.033" to 0.030". Preferably the maximum size of the sheets used to fabricate the scoops and therefore the maximum scoop thickness are 0.031".

The scoop of the invention may be made, if desired, of recycled PET or other polymer. The side to side and top to bottom tapering of the ribs has resulted in increased scooping strength.

In a most preferred embodiment, one or more ribs extend from the outer surface of the rear sidewall and continue projecting outwardly toward the rear sidewall along the under surface of the handle. Preferably a plurality of ribs extends at least 50% of handle length, more preferably at least 80% of the handle to length.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. A scoop comprising
    (a) a basket having a plurality of side walls at a front end, and
    (b) a handle integrally formed with said basket at a rear end and extending from a top end of a first of said side walls, said first side wall having a length extending from said top end to a bottom end of said first side wall, said first side wall having an inner face and an outer face, at least one of said first side wall faces including a plurality of ribs projecting from said face and extending from said handle down said side wall, said ribs having a line of maximum projection and having side walls extending toward said face on one or both sides of said maximum line of projection, said rib side walls having generally rectilinear portions and one or more of said rectilinear portions of said rib side walls of said plurality of ribs having a taper of at least 1° with respect to a plane extending through said line of maximum projection from the back to the front of the scoop.

2. The scoop according to claim 1 wherein said taper is at least 2° with respect to said plane extending through maximum line of projection.

3. The scoop according to claim 1 wherein said line of maximum projection tapers from a maximum distance from said first side wall at said top end of said first side wall to a minimum distance from said first side wall adjacent said bottom end of said first side wall.

4. The scoop according to claim 1 wherein at least three said ribs project outwardly from said outer face of said first side wall.

5. The scoop according to claim 1 wherein said handle includes a first handle face on a side adjacent said first side wall outer face and a second handle face on a side opposite said first handle face, said plurality of ribs being disposed on said first sidewall outer face and continuing from said top of said first sidewall along and projecting outwardly toward said first sidewall from said first handle face.

6. The scoop according to claim 5 wherein said handle has a length which extends from said top of said first side wall to a free edge on a side opposite said first side wall top, said plurality of ribs extending at least 50% of said handle length.

7. The scoop according to claim 6 wherein said plurality of ribs extends at least 80% of said handle length.

8. The scoop according to claim 1 wherein said plurality of ribs extends at least 70% of the length of said first side wall.

9. The scoop according to claim 1 wherein said plurality of ribs extends at least 75% of the length of said first side wall.

10. The scoop according to claim 1 wherein its thickness is, on average, no greater than 0.0312 inches thick.

11. The scoop according to claim 1 made from a starting sheet which is 0.030 inches thick or less.

12. The scoop according to claim 1 fabricated from a polymer.

13. The scoop according to claim 12 wherein said polymer is polyethylene terephthalate.

14. The scoop according to claim 12 made of a multilayer structure.

15. The scoop according to claim 12 having a foamed middle layer in a trilayer structure.

16. The scoop according to claim 1 wherein said scoop is molded from a polymer.

* * * * *